United States Patent
Lee et al.

(10) Patent No.: US 7,068,422 B2
(45) Date of Patent: Jun. 27, 2006

(54) OPTICAL FIBER AMPLIFICATION METHOD AND APPARATUS FOR CONTROLLING GAIN

(75) Inventors: Jyung-chan Lee, Daejeon (KR); Seung-il Myong, Daejeon (KR); Moo-jung Chu, Daejeon (KR); Hyun-jae Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 367 days.

(21) Appl. No.: 10/392,614

(22) Filed: Mar. 19, 2003

(65) Prior Publication Data

US 2003/0223106 A1  Dec. 4, 2003

(30) Foreign Application Priority Data

May 7, 2002  (KR) ............................... 2002-24994

(51) Int. Cl.
*H04B 10/12* (2006.01)
(52) U.S. Cl. ............................... 359/341.41; 359/337.4
(58) Field of Classification Search .............. 359/337.4, 359/341.41
See application file for complete search history.

(56) References Cited

U.S. PATENT DOCUMENTS

| | | | |
|---|---|---|---|
| 5,900,968 A | | 5/1999 | Srivastava et al. |
| 5,991,068 A | | 11/1999 | Massicott et al. |
| 6,049,413 A | * | 4/2000 | Taylor et al. ................ 359/337 |
| 6,055,092 A | | 4/2000 | Sugaya et al. |
| 6,175,436 B1 | | 1/2001 | Jackel |
| 6,215,584 B1 | | 4/2001 | Yang et al. |
| 6,246,514 B1 | * | 6/2001 | Bonnedal et al. ....... 359/341.41 |
| 6,359,727 B1 | * | 3/2002 | Nakazato .................. 359/337.4 |
| 6,373,625 B1 | * | 4/2002 | Kobayashi et al. .... 359/341.41 |
| 6,577,789 B1 | * | 6/2003 | Wang .......................... 385/27 |
| 6,690,506 B1 | * | 2/2004 | Zahnley et al. ......... 359/337.11 |
| 6,721,089 B1 | * | 4/2004 | Miller et al. .............. 359/341.3 |
| 6,977,770 B1 | * | 12/2005 | Komaki et al. ........ 359/337.11 |
| 2002/0186460 A1 | * | 12/2002 | Lelic ....................... 359/341.4 |

FOREIGN PATENT DOCUMENTS

| | | |
|---|---|---|
| JP | 07-202306 | 8/1995 |
| KR | 2000-9215 | 2/2000 |

* cited by examiner

*Primary Examiner*—Jack Keith
*Assistant Examiner*—Eric Bolda
(74) *Attorney, Agent, or Firm*—Blakely Sokoloff Taylor & Zafman

(57) ABSTRACT

Provided are an optical fiber amplification method and apparatus for controlling a gain. Initial values including target gains of first and second amplifications for an optical amplifier amplifying the input light signal are set. Power of the input light signal is measured and the power of first and second backward pump lights proceeding in the opposite direction to the input light signal is controlled based on the measured power. The input light signal is firstly amplified and a first amplification gain of the amplified light signal is calculated. Power of a first forward pump light proceeding in the same direction as the input light signal is controlled so that the first amplification gain can be substantially equal to the target gain of the first amplification. The firstly amplified light signal is secondly amplified and a second amplification gain with respect to the input light signal is calculated. The power of a second forward pump light proceeding in the same direction as the input light signal is controlled so that the second amplification gain can be substantially equal to the target gain of the second amplification.

6 Claims, 7 Drawing Sheets

OPTICAL FIBER AMPLIFICATION METHOD AND APPARATUS FOR CONTROLLING GAIN

BACKGROUND OF THE INVENTION

This application claims the priority of Korean Patent Application No. 2002-24994, filed May 7, 2002, in the Korean Intellectual Property Office, the disclosure of which is incorporated herein in its entirety by reference.

1. Field of the Invention

The present invention relates to an optical fiber amplification method and apparatus which control a gain, and more particularly, to an optical fiber amplification method and apparatus which control a gain so that optical power of a wavelength division multiplexed (WDM) optical fiber amplifier in which channels are added/dropped is substantially constant.

2. Description of the Related Art

In a wavelength division multiplexing (WDM) method, a plurality of light signals having different wavelengths are transmitted via one optical fiber. In the WDM method, since a light signal having multi-wavelength optical channels is used in the light transmission, a wide bandwidth provided by the optical fiber can be efficiently used. Accordingly, the WDM method is widely used as a next generation light transmission technique.

An erbium-doped fiber amplifier (EDFA) is used to amplify a light signal in a WDM transmission system. An erbium-doped fiber (EDF) is made by doping an optical fiber with erbium ($Er^{3+}$). The light signal is amplified by energy generated when a laser pumps erbium so that erbium ions are excited and returned to an original energy level.

In the WDM transmission system, the number of channels of light signals varies due to a system capacity change, a transmission channel error, and channel addition/dropping caused by the reconstruction of a transmission network. Due to the characteristics of the EDF used as a gain medium in the EDFA, survival channels being operated, i.e., remaining optical channels among a plurality of optical channels, are transited to a steady state through a transient state by the EDFA, and gain and light output of the EDFA are changed instantly, resulting in light transmission service errors.

A light transmission system, which transmits a light signal over a long distance, generally includes a plurality of EDFAs. Thus, although an output light fluctuation is very small in each of the EDFAs, the transmission of light signals via the plurality of EDFAs causes serious light signal errors. This is because an EDF has a gain in-homogeneity characteristic and a cross gain saturation characteristic. A variation in gain of survival channels when changing the wavelengths of the survival channels is referred to as the gain in-homogeneity characteristic. Adjusting a predetermined gain value shared by a plurality of channels in accordance with changes in the number of channels is referred to as the cross gain saturation characteristic. Due to the gain in-homogeneity characteristic and the cross gain saturation characteristic of the EDF, gain becomes varying according to the wavelengths of the survival channels and gain distribution of the survival channels. As a result, a gain control method for compensating for power inequality of each channel is required.

There are three methods of controlling the gain of the EDFA. In the first gain control method, extra channels additionally operate in a wavelength band different from a multi-channel wavelength band being operated to adjust population inversion of an EDF so that a gain can be controlled. However, in this case, as the number of channels being operated increases, the extra channels require the higher maximum power than ever and noise due to a non-linear effect can be made in a multi-channel light signal being operated.

In the second gain control method, a portion of light beyond a wavelength band of a multi-channel light signal being operated is optically fed back to induce lasing so that population inversion is maintained to optically control a gain. In this method, the power of lased light is transiently damped and oscillated due to a variation in the power of an input light signal. This phenomenon occurs when the upper-level lifetime of erbium ions contributing to lasing as a gain medium is longer than the lifetime of photons in a cavity and then balanced population inversion is transiently perturbed. If this phenomenon is not removed or is not controlled to an appropriate level or less, this phenomenon affects the survival channels.

In the third gain control method, the gain of an EDFA is controlled by detecting an input light signal to adjust the power of excited light to a proper level. Although this method can be easily accomplished in respect of cost and operation, a gain control range gets larger in proportion to the number of channels used in the light transmission, and a high speed control circuit that responds faster as the number of amplifiers increases is required in a long distance transmission system.

As a conventional invention for automatic gain control and automatic level control, "Gain-shifted EDFA With All-optical Automatic Gain Control" by M. Artiglia, ECOC'98, pp. 293–294, 1998, discloses a method of uniformly maintaining population inversion in an EDF by feeding back a portion of output light. However, this invention is unsuitable for an EDFA having a high gain because the portion of light is fed back, and the gain in-homogeneity characteristic of the EDF is not considered.

Accordingly, an EDFA considering a gain in-homogeneity characteristic and a cross gain saturation characteristic is required to obtain a wide gain bandwidth and a high power characteristic.

SUMMARY OF THE INVENTION

Accordingly, the present invention provides an optical fiber amplification method and apparatus which control the power of pump light by comparing the power of an input light signal with the power of an output light signal of a first-stage EDFA and the power of an output light signal of a second-stage EDFA in a two-stage EDFA, which amplifies a multi-wavelength multiplexed light signal.

According to an aspect of the present invention, there is provided an optical fiber amplification method by which a multi-wavelength multiplexed input signal is amplified using pump light. Initial values including target gains of first and second amplifications for an optical amplifier amplifying the input light signal are set. Power of the input light signal is measured and the power of first and second backward pump lights proceeding in the opposite direction to the input light signal is controlled based on the measured power. The input light signal is firstly amplified and a first amplification gain of the amplified light signal is calculated. Power of a first forward pump light proceeding in the same direction as the input light signal is controlled so that the first amplification gain can be substantially equal to the target gain of the first amplification. The firstly amplified light signal is secondly amplified and a second amplification gain with respect to the input light signal is calculated. Power of a second forward pump light proceeding in the same direction as the input light signal is controlled so that the second amplification gain can be substantially equal to the target gain of the second amplification.

According to another aspect of the present invention, there is also provided an optical fiber amplifier amplifying a multi-wavelength multiplexed input signal. The optical fiber amplifier includes a forward pump source portion, a backward pump source portion, a first amplifier, a second amplifier, and a gain controller. The forward pump source portion emits first pump lights and advances the fist pump lights in the same direction as the input light signal. The backward pump source portion emits second pump lights and advances the second pump lights in the opposite direction to the input light signal. The first amplifier amplifies the input light signal using a portion of the first pump lights and a portion of the second pump lights. The second amplifier amplifies a light signal output from the first amplifier using the rest of the first pump lights and the rest of the second pump lights. The gain controller measures power of the input light signal, controls power of the second pump lights based on the measured power, measures power of the light signal amplified by the first amplifier and power of the light signal amplified by the second amplifier, calculates first and second gains from the measured powers of the firstly and secondly amplified light signal and the power of the input light signal, and controls the power of the first pump lights so that the first and second gains can be substantially equal to target values.

BRIEF DESCRIPTION OF THE DRAWINGS

The above aspect and advantages of the present invention will become more apparent by describing in detail preferred embodiments thereof with reference to the attached drawings in which.

DETAILED DESCRIPTION OF THE INVENTION

Hereinafter, embodiments of the present invention will be described in detail with reference to the attached drawings.

Figure 1:
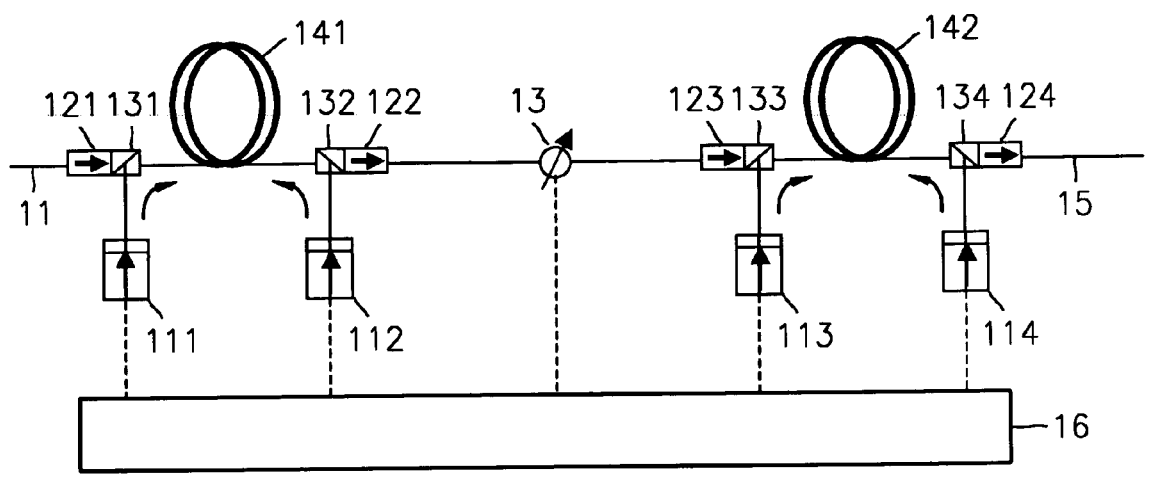
FIG. 1 illustrates a general configuration of an erbium-doped fiber amplifier (EDFA) having a bidirectional pump structure.

FIG. 1 illustrates a general configuration of an erbium-doped fiber amplifier (EDFA) having a bidirectional pump structure. Referring to FIG. 1, the EDFA includes an input port 11, an output port 15, first and second forward pump sources 111 and 113, first and second backward pump sources 112 and 114, a plurality of isolators 121, 122, 123, and 124, a plurality of optical couplers 131, 132, 133, and 134, first and second erbium-doped fibers (EDF) 141 and 142, an optical attenuator 13, and a gain controller 16.

The operation of the EDFA will now be described. A multi-wavelength multiplexed light signal is input to the input port 11 and a light signal amplified by the second EDF 142 is output to the output port 15. The first forward pump source 111 emits pump light in the same direction as the input light signal so that the pump light is input to the first EDF 141. The first backward pump source 112 emits pump light in the opposite direction to the input light signal so that the pump light is input to the first EDF 141. The plurality of isolators 121, 122, 123, and 124 pass light proceeding in the same direction as the input light signal but do not pass light proceeding backward. The plurality of optical couplers 131, 132, 133, and 134 couple the pump light emitted from the pump sources 111, 112, 113, and 114 to the light signal. The first and second EDF 141 and 142 each amplify the light signal using the pump light. The optical attenuator 13 attenuates the power of the light signal amplified by the first EDF 141. The gain controller 16 controls a degree of the attenuation by the optical attenuator 13 and the driving voltages of the pump sources 111, 112, 113, and 114 to control the power of the pump light. The bi-directional pump light is required to amplify light having a high power and a long wavelength within a range of 1570–1605 nm. A unidirectional pump structure is unsuitable for high output power because the pump light cannot reach the end of the EDF.

Figure 2:
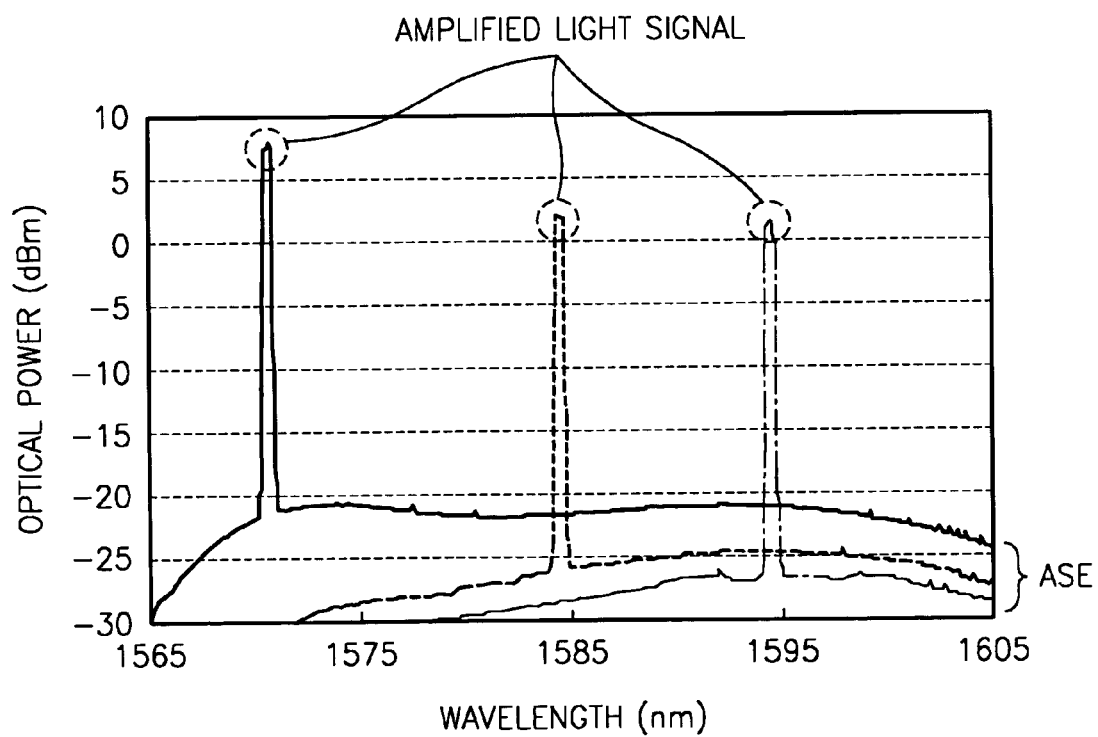
FIGS. 2 through 7 are graphs illustrating detailed operation characteristics of the EDFA shown in FIG. 1.
Figure 3:
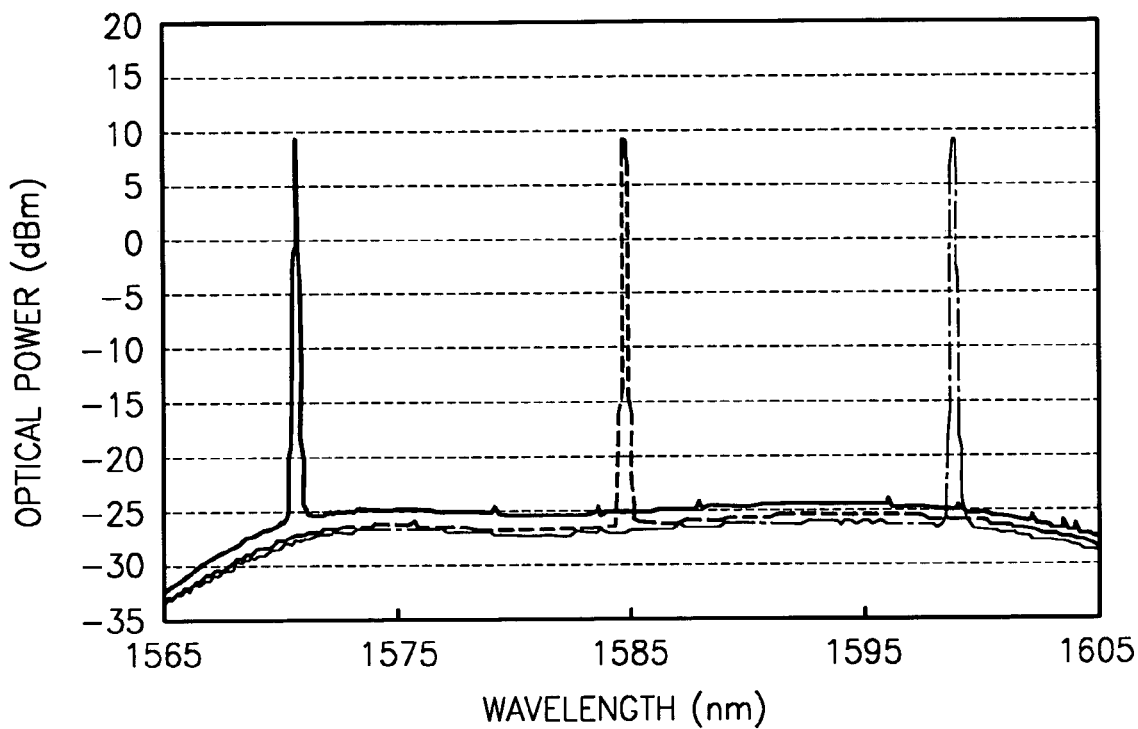

FIGS. 2 through 7 are graphs illustrating detailed characteristics of the EDFA operated as described above. FIG. 2 shows powers of light signals output from the EDFA when the light signals whose powers are the same but whose wavelengths are not are input respectively to the EDFA shown in FIG. 1, and a driving voltages of the pump sources 111, 112, 113, and 114 are the same. As seen in FIG. 2, the powers of the amplified output light signals vary depending on wavelengths, and the powers of amplified spontaneous emissions (ASE) also vary and are not flat. FIG. 3 shows powers of light signals output from the EDFA when the driving voltages of the pump light sources 111, 112, 113, and 114 are properly controlled according to the input light signals whose powers are the same but whose wavelengths are not. As seen in FIG. 3, the powers of the amplified light signals are constant and the ASE is flatter than the ASE shown in FIG. 2.

Figure 4:
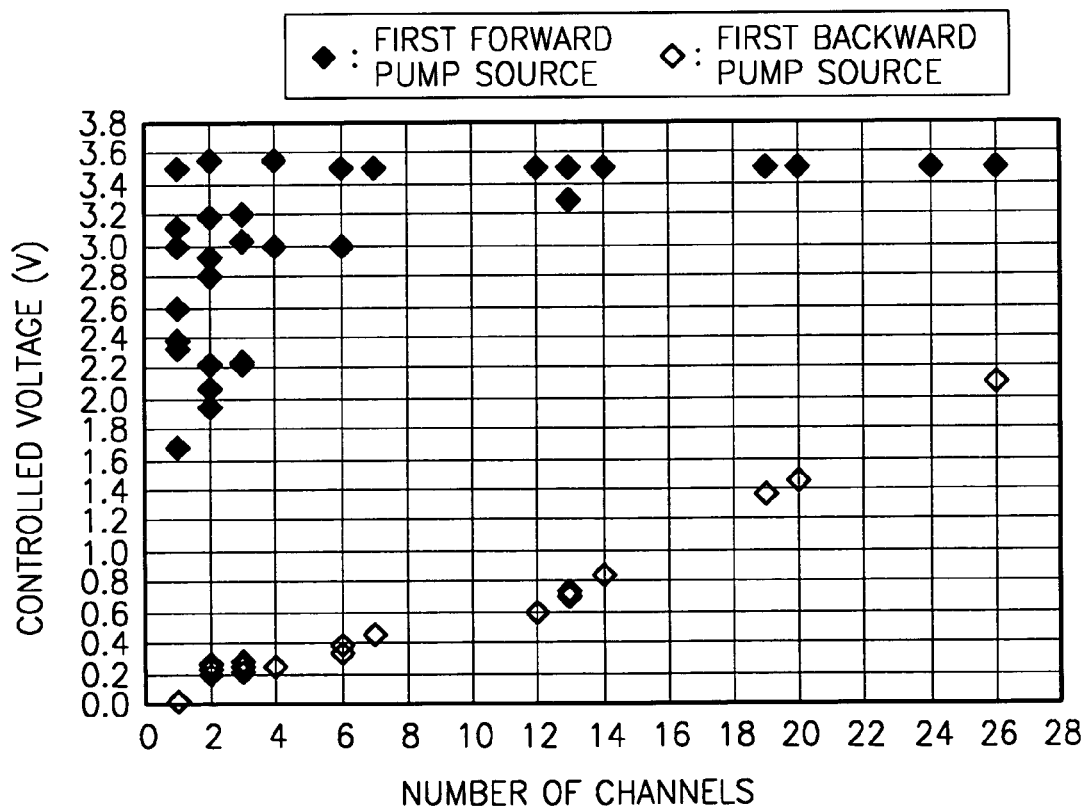
Figure 5:
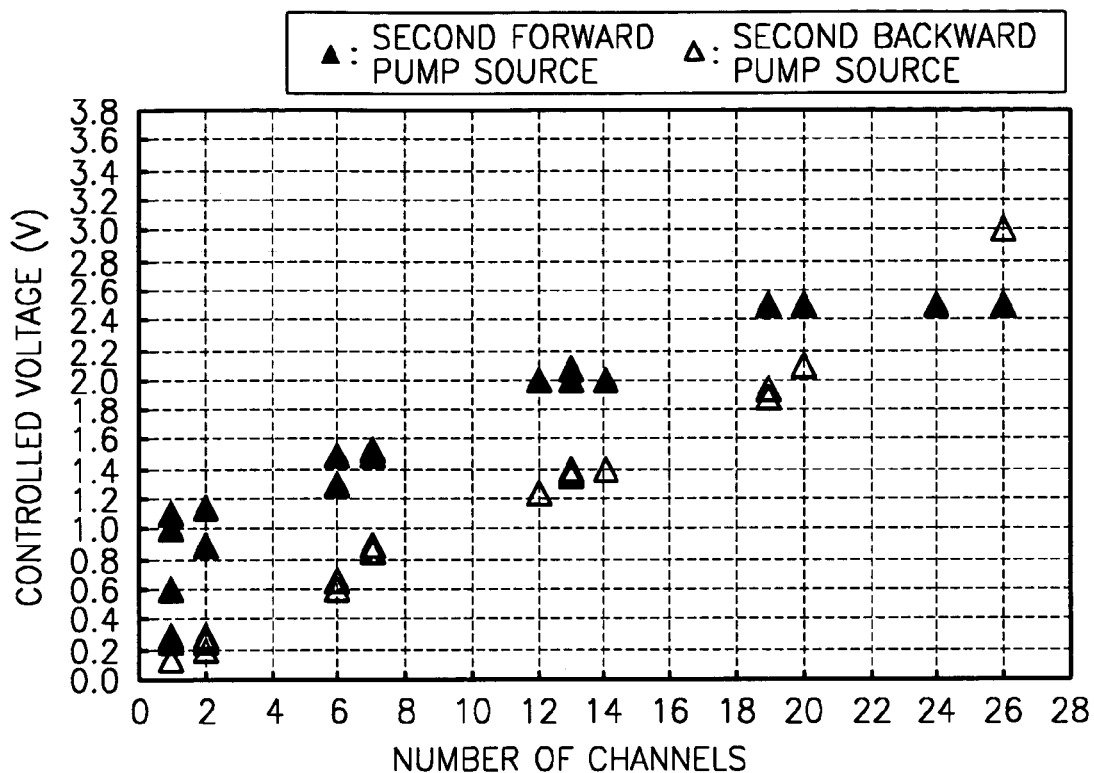

FIG. 4 shows voltages of the first forward pump source 111 and the first backward pump source 112, which are controlled so that when the number of channels and wavelengths of an input light signal are changed, each power with respect to wavelengths of the light signal measured between the optical isolator 122 and the optical attenuator 13 of FIG. 1 is substantially identical as shown in FIG. 3. FIG. 5 shows voltages of the second forward pump source 113 and the second backward pump source 114, which are controlled so that each power of a light signal output via the output port 15 of FIG. 1 is the same as shown in FIG. 3 under conditions of which the number of channels and wavelengths of an input signal are changed identically with the case of FIG. 4.

Figure 6:
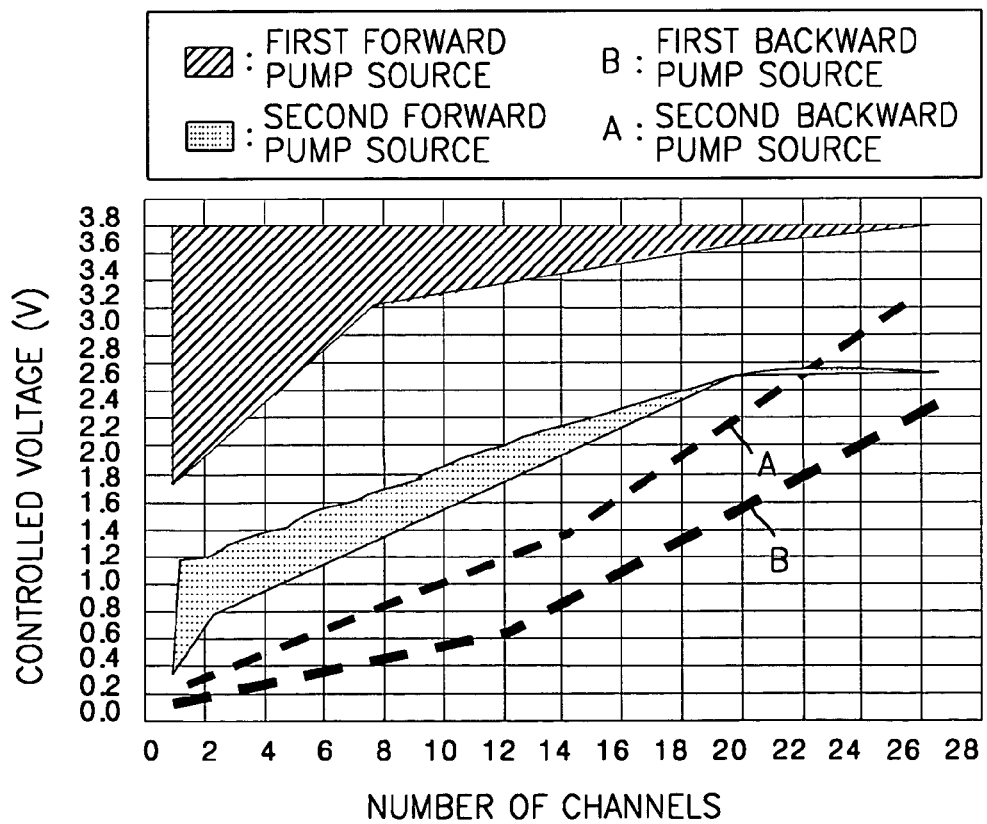

FIG. 6 shows a combination of the result shown in FIG. 4 and the result shown in FIG. 5. As seen in FIG. 6, control ranges of driving voltages of the first and second forward pump sources 111 and 113 are wider than control ranges of driving voltages of the first and second backward pump sources 112 and 114 when the number of channels is changed or wavelengths of channels are changed. The driving voltages of the first and second backward pump sources 112 and 114 are separated into two linear areas.

Figure 7:
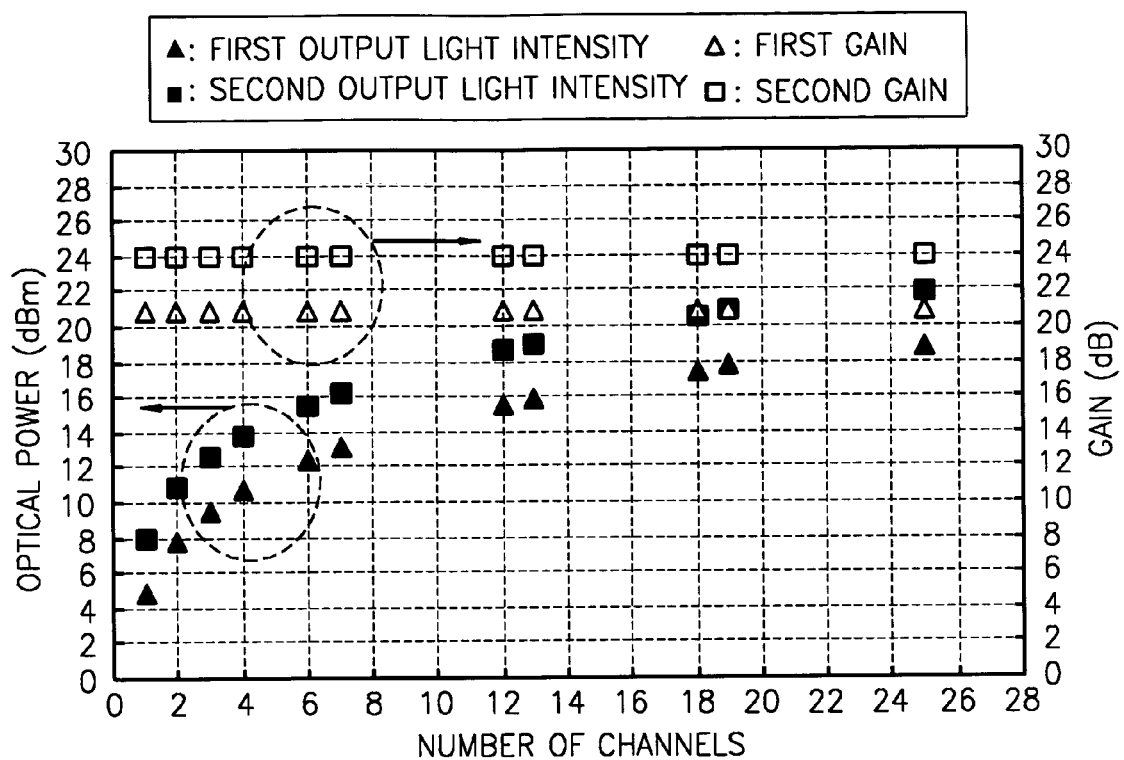

FIG. 7 shows optical powers and gains of light signals measured between the optical isolator 122 and the optical attenuator 13 and at the output port 15. A first optical power and a first gain are measured between the optical isolator 122 and the optical attenuator 13, and a second optical power and a second gain are measured at the output port 15. In particular, the second gain is obtained by comparing optical power measured at the output port 15 with optical power measured at the input port 11. As seen in FIG. 7, the measured output optical powers vary depending on variations in the number of channels or wavelengths while the gains are constantly maintained.

Accordingly, in order to obtain high power and a wide gain bandwidth, with reference to FIG. 6, the first and second backward pump sources 112 and 114, which are relatively easily controlled, should be firstly controlled, and then the first and second forward pump sources 111 and 113, which are more sensitive to a gain in-homogeneity characteristic and a cross gain saturation characteristic of each wavelength that the first and second backward pump sources 112 and 114, should be controlled.

Figure 8:
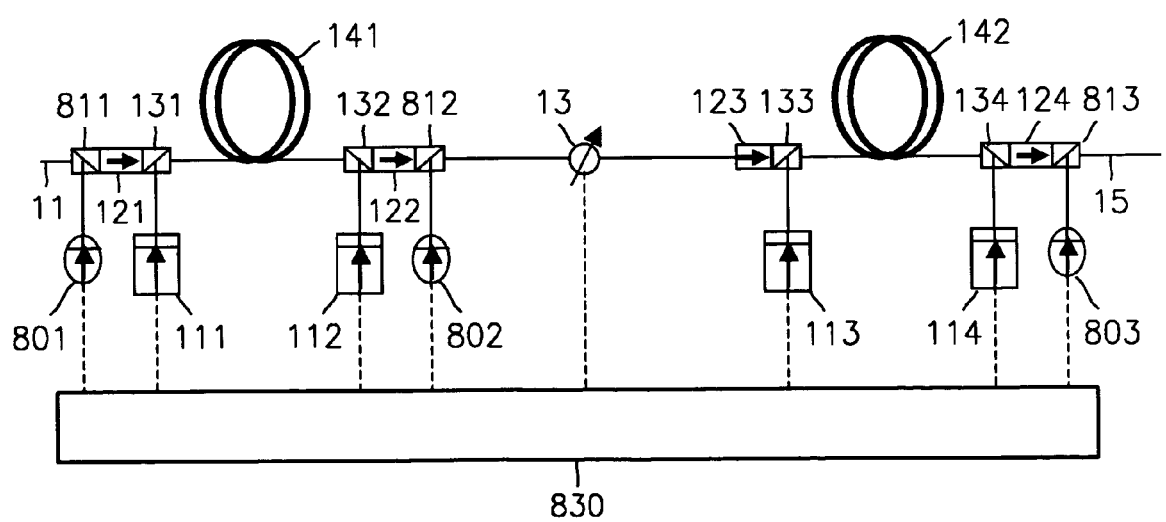
FIG. 8 illustrates a configuration of an EDFA for amplifying a light signal according to the present invention.

FIG. 8 illustrates a configuration of an EDFA amplifying a light signal reflecting the above-described characteristics according to the present invention. Referring to FIG. 8, the EDFA includes an input port 11, an output port 15, first and second forward pump sources 111 and 113, first and second backward pump sources 112 and 114, a plurality of isolators 121, 122, 123, and 124, a plurality of optical couplers 131, 132, 133, and 134, first and second EDFs 141 and 142, and an optical attenuator 13, which operate the same as elements shown in FIG. 1. Besides these elements, the EDFA further includes a plurality of optical/electrical converters 801, 802, and 803, a plurality of optical splitters 811, 812, and 813, and a controller 830.

The plurality of optical splitters 811, 812, and 813, which are connected to the plurality of optical/electrical converters 801, 802, and 803, split a portion of light from a light signal. The optical/electrical converters 801, 802, and 803 convert the split light signal to an electrical signal. The controller 830 indirectly reads the power of the light signal from the power of the electrical signal and then controls the driving voltages of the pump sources 111, 112, 113, and 114 according to a predetermined algorithm. The controller 830 may further include a data storage unit (not shown) which stores the algorithm or data necessary for controlling the driving voltages. The algorithm is illustrated by a flowchart shown in FIG. 9.

Figure 9:
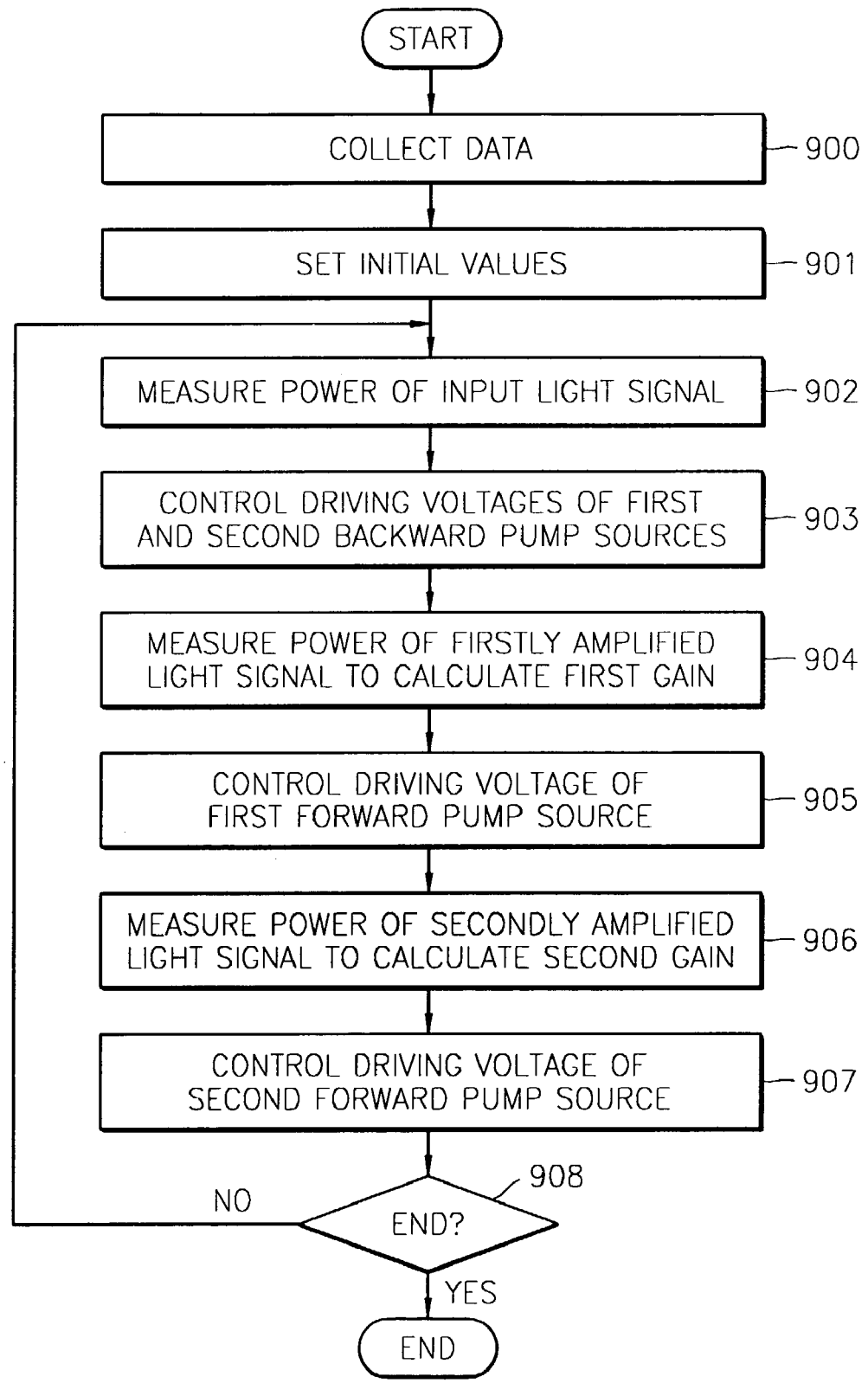
FIG. 9 is a flowchart of an optical fiber amplification method according to the present invention.

Referring to FIG. 9, in step 900, data for controlling the driving voltages of the pump sources 111, 112, 113, and 114 necessary for controlling an amplification gain of the EDFA is collected. Here, the data means the one related to the controlling of the driving voltages as shown in FIGS. 2 through 7. When the data collection is completed, initial values are set in step 901. The initial values are initial driving voltages of the pump sources 111, 112, 113, and 114, first and second target gains, and so forth. The initial driving voltages of the pump sources 111, 112, 113, and 114 are set roughly within the control ranges shown in FIG. 6. The first target gain is a target value corresponding to a first gain obtained by comparing the power of the input light signal with the measured power of a light signal output from the optical isolator 122 of FIG. 8. The second target gain is a target value corresponding to a second gain obtained by comparing the power of the input light signal with the measured power of a light signal output from the output port 15.

The first optical splitter 811 splits a portion of light from an input light signal when the input light signal is input to the input port 11, and the first optical/electrical converter 801 converts the split light signal to an electrical signal. In step 902, the controller 830 indirectly measures the power of the light signal from the power of the electrical signal. In step 903, the controller 830 estimates the number of channels of the input light signal based on the measured power of the input light signal to control the driving voltages of the first and second backward pump sources 112 and 114 as shown in FIG. 6 and according to the collected data in step 900. The first EDF 141 amplifies the input light signal using pump light pumped by the first forward pump source 111 and the first backward pump source 112. The second optical splitter 812 splits a portion of a light signal amplified by the first EDF 141. The second optical/electrical converter 802 converts the split light signal to an electrical signal and outputs the electrical signal to the controller 830. In step 904, the controller 830 measures the power of the amplified light signal from the power of the electrical signal input from the second optical/electrical converter 802 and calculates a first gain by comparing the power of the amplified light signal with the power of the input light signal. In step 905, the controller 830 controls the driving voltage of the first forward pump source 111 so that the first gain becomes substantially equal to the first target gain.

The second EDF 142 secondly amplifies the light signal that has been amplified by the first EDF 141 and attenuated by the optical attenuator 13 using pump light pumped by the second forward pump source 113 and the second backward pump source 114. The third optical splitter 813 splits a portion of light from the secondly amplified light signal and the second optical/electrical converter 803 converts the split light signal to an electrical signal. In step 906, the controller 830 measures the power of the secondly amplified light signal from the power of the electrical signal and calculates a second gain by comparing the power of the secondly amplified light signal with the power of the input light signal. In step 907, the controller 830 controls the driving voltage of the second forward pump source 113 so that the second gain becomes substantially equal to the second target gain. In step 908, this process is repeated while light signals are continuously input.

Figure 10:
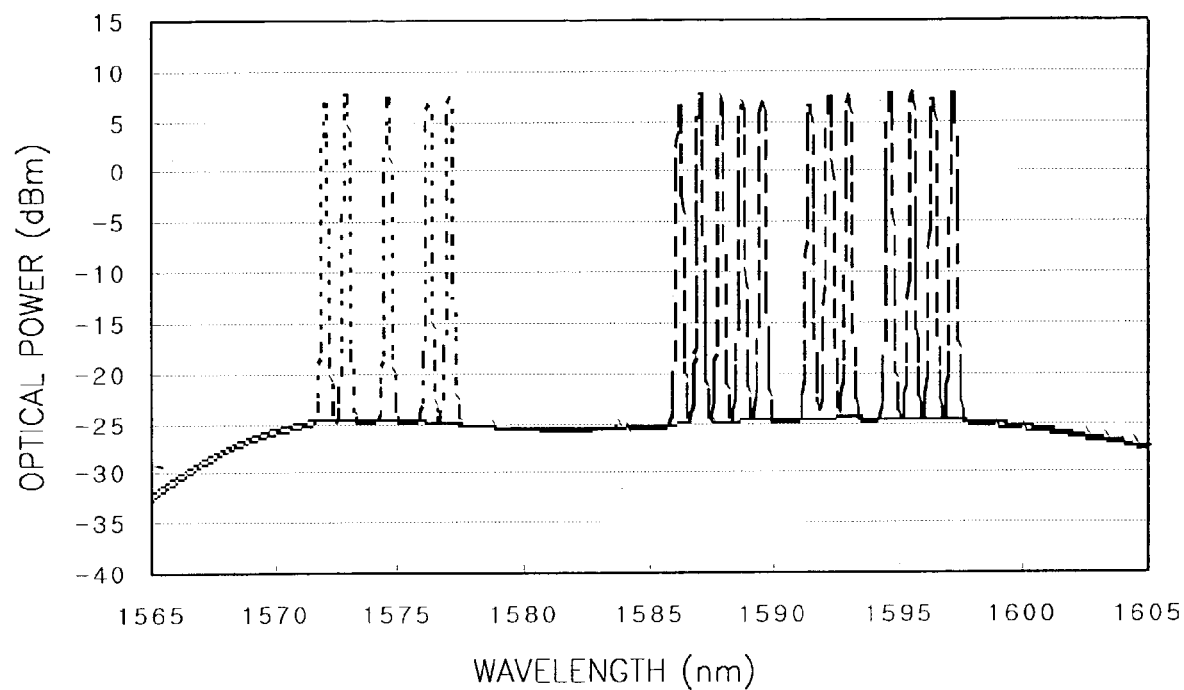
FIGS. 10 through 13 are graphs illustrating output optical power when the number of channels included in an input light signal changes due to channel adds/drops.
Figure 11:
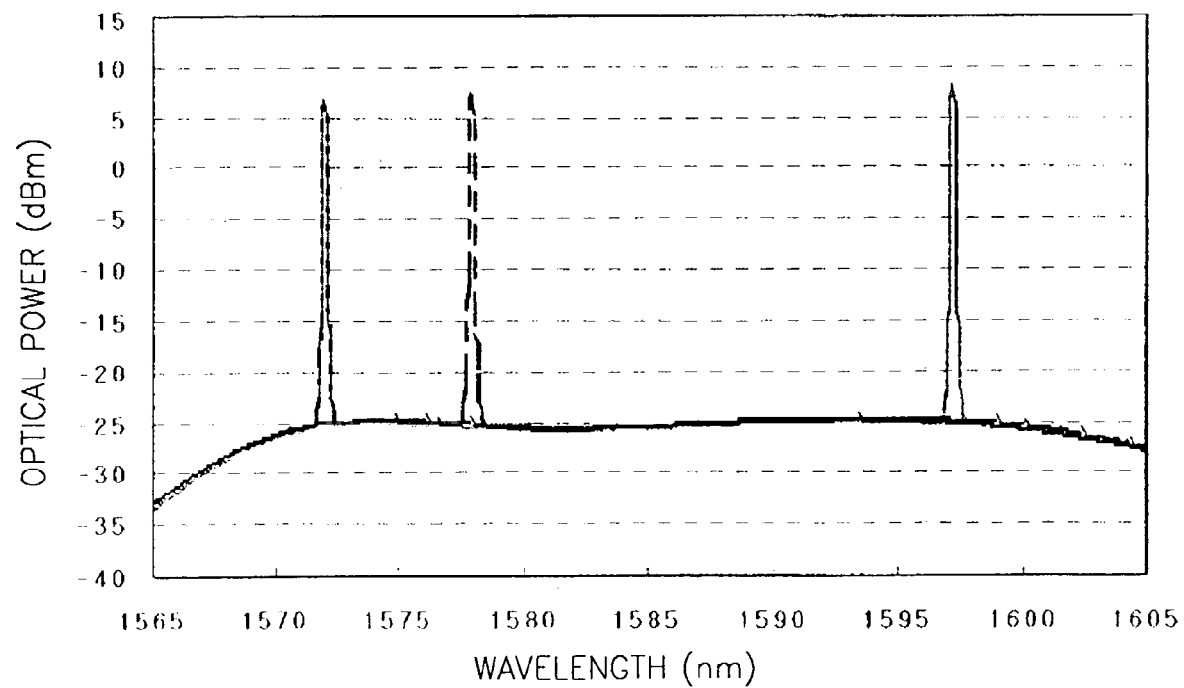

FIGS. 10 and 11 respectively show optical power output when the number of channels included in an input light signal is changed due to channel adds/drops in each band. As seen in FIGS. 10 and 11, the output optical powers are substantially identical.

Figure 12:
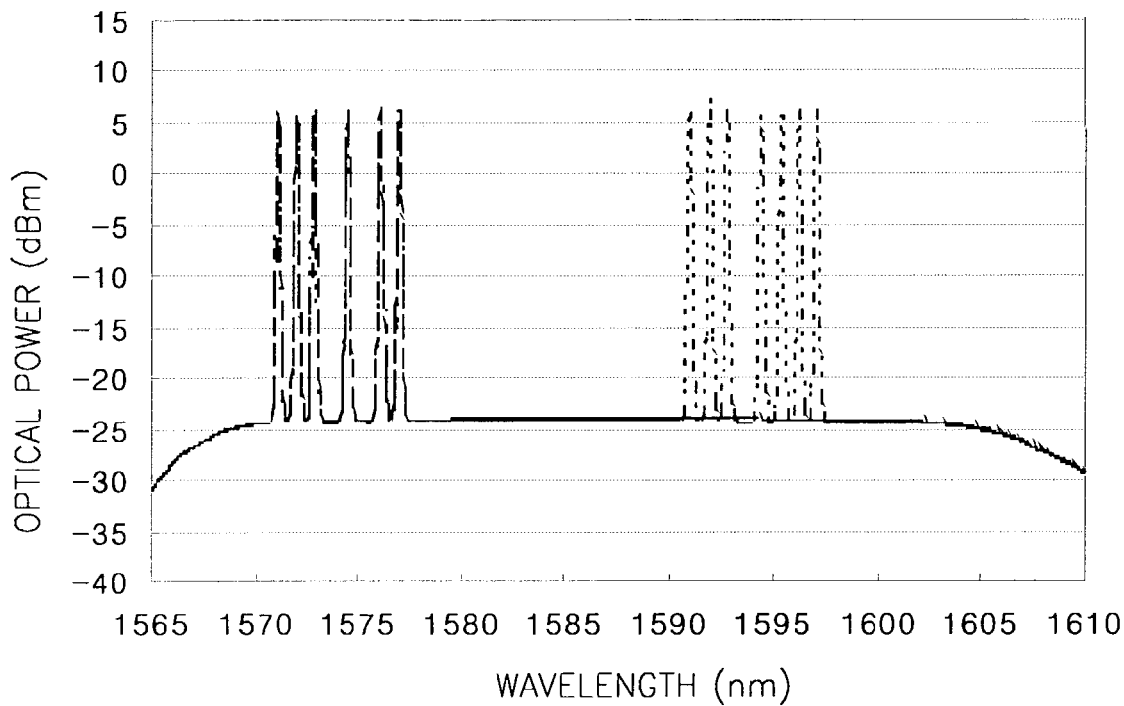
Figure 13:
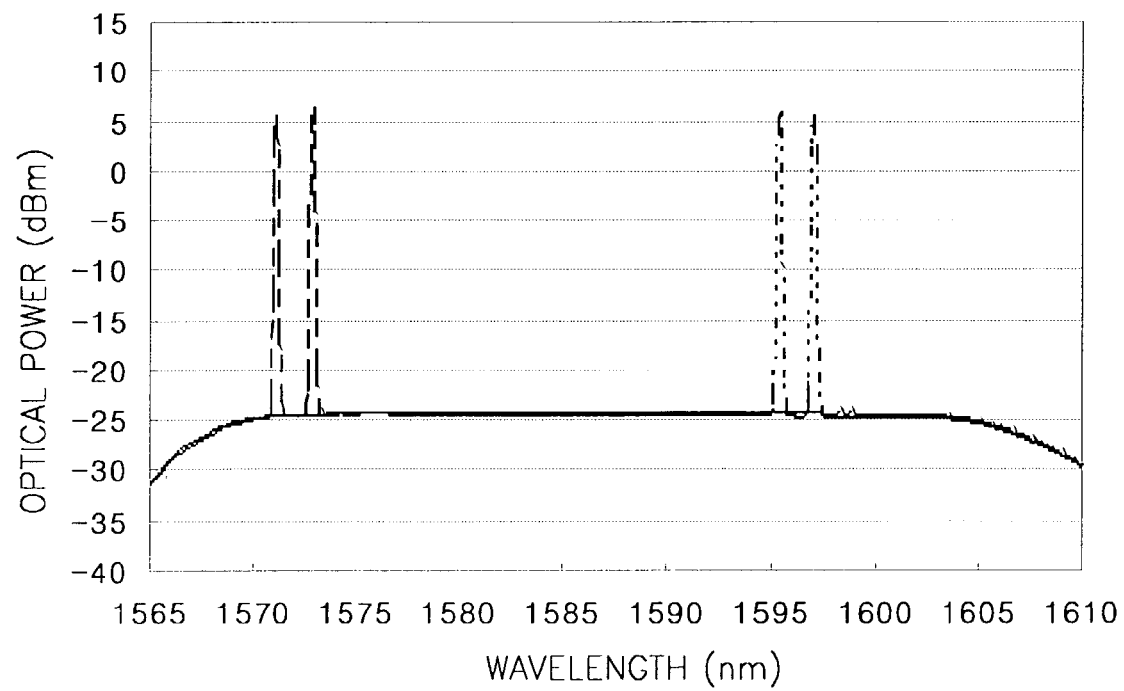

FIGS. 12 and 13 respectively show optical power output when the number of channels included in an input light signal is changed due to channel adds/drops in each band in case where a gain equalizing filter (not shown) is further included between the second optical splitter 812 and the optical attenuator 13 of the EDFA of FIG. 8 so as to broaden a gain bandwidth of the EDFA. As seen in FIGS. 12 and 13, the output optical powers are substantially identical. The output optical powers are more flattened than output optical powers shown in FIGS. 10 and 11, and thus the gain bandwidth is more broadened.

According to the present invention, driving voltages of pump sources are controlled in an EDFA so that gain unbalance can be solved in consideration of a gain in-homogeneity characteristic. Thus, powers of amplified optical signals can be maintained substantially identically due to gain controls according to their wavelengths. Also, it is possible to flexibly cope with variations in the number of channels due to channel adds/drops during the light signal transmission.

What is claimed is:

1. An optical fiber amplification method by which a multi-wavelength multiplexed input signal is amplified using pump light, the optical fiber amplification method comprising:

(a) setting initial values including target gains of first and second amplifications for an optical amplifier amplifying the input light signal, the target gain for the first amplification is obtained by comparing power of a first input signal with measured power of a first output signal, the target gain for the second amplification is obtained by comparing power of the first input signal with measured power of a second output signal;

(b) indirectly measuring power of the input light signal and estimating number of channels of the input light signal based on power of the input light signal to control power of first and second backward pump lights proceeding in the opposite direction to the input light signal;

(c) firstly amplifying the input light signal and calculating a first amplification gain of the amplified light signal;

(d) controlling power of a first forward pump light proceeding in the same direction as the input light signal so that the first amplification gain can be substantially equal to the target gain of the first amplification;

(e) secondly amplifying the firstly amplified light signal and calculating a second amplification gain with respect to the input light signal; and (f) controlling the power of a second forward pump light proceeding in the same direction as the input light signal so that the second amplification gain can be substantially equal to the target gain of the second amplification.

2. The optical fiber amplification method of claim 1, further comprising (g) repeating steps (b) through (f) while the input light signal is input.

3. The optical fiber amplification method of claim 1, wherein the powers of the pump lights are adjusted by controlling the driving voltages of pump sources generating the pump lights.

4. The optical fiber amplification method of claim 3, before step (a), further comprising collecting data including powers of the pump lights according to the power of the input light signal.

5. An optical fiber amplifier amplifying a multi-wavelength multiplexed input signal, the optical fiber amplifier comprising:

a forward pump source portion which emits first pump lights and advances the first pump lights in the same direction as the input light signal;

a backward pump source portion which emits second pump lights and advances the second pump lights in the opposite direction to the input light signal;

a first amplifier which is configured to amplify the input light signal using a portion of the first pump lights and a portion of the second pump lights;

a second amplifier is configured to amplify a light signal output from the first amplifier using the rest of the first pump lights and the rest of the second pump lights; and a gain controller which is configured to indirectly measures power of the input light signal, controls power of the second pump lights based on the indirectly measured power, indirectly measures power of the light signal amplified by the first amplifier and power of the light signal amplified by the second amplifier, calculates first gain from the indirectly measured power of the first amplified light signal and the power of the input light signal by comparing power from the first amplified light signal with power of the input light signal, calculates second gain from the indirectly measured power of the second amplified light signal and the power of the input light signal by comparing power from the second amplified light signal with power of the input light signal and control the power of the first pump lights so that the first and second gains can be substantially equal to target gain values.

6. The optical fiber amplifier of claim 5, wherein the gain controller comprises:

a first optical/electrical converter which converts a portion of the input light signal to an electrical signal;

a second optical/electrical converter which converts a portion of a light signal output from the first amplifier to an electrical signal;

a third optical/electrical converter which converts a portion of a light signal output from the second amplifier to an electrical signal; and a controller which controls the power of the second pump lights based on the output power of the first optical/electrical converter and controls the power of the first pump light by comparing output powers of the second and third optical/electrical converters with the output power of the first optical/electrical converter.

* * * * *